Dec. 30, 1952     L. FRANKEL     2,623,225
FILM CLEANING DEVICE
Filed Nov. 1, 1947     2 SHEETS—SHEET 1
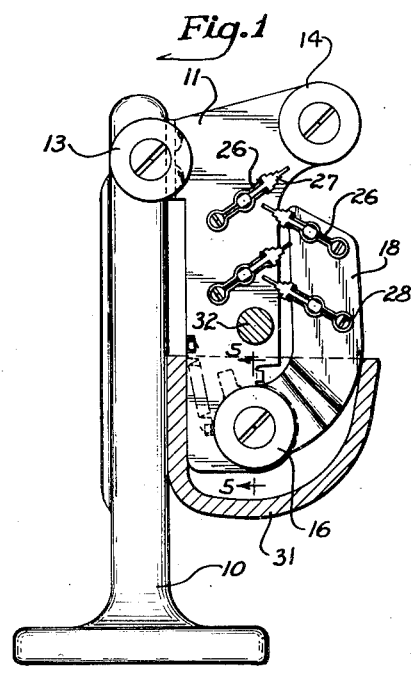
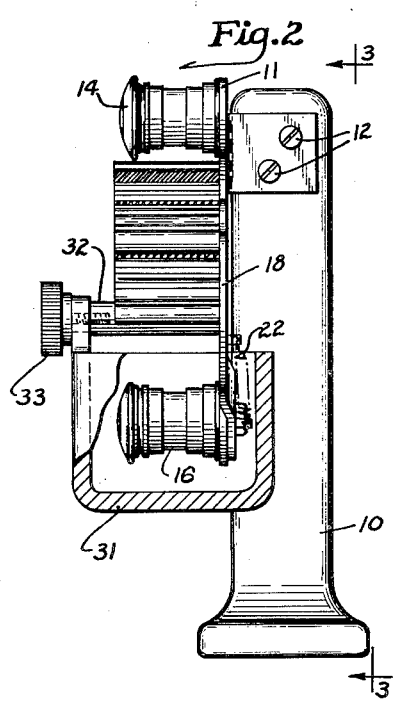
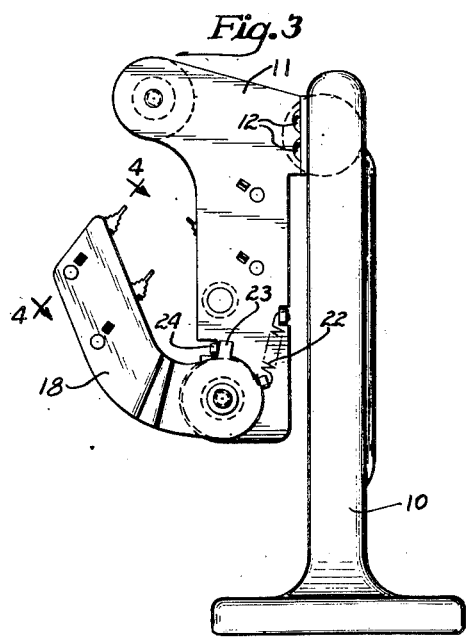
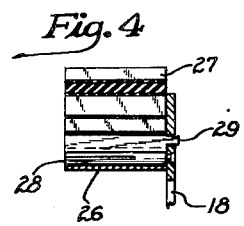
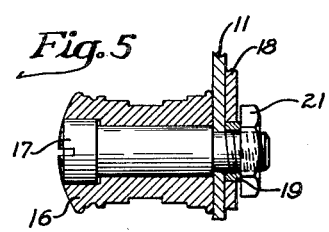
INVENTOR.
Leo Frankel
BY
McLaughlin & Wallenstein
Attys.

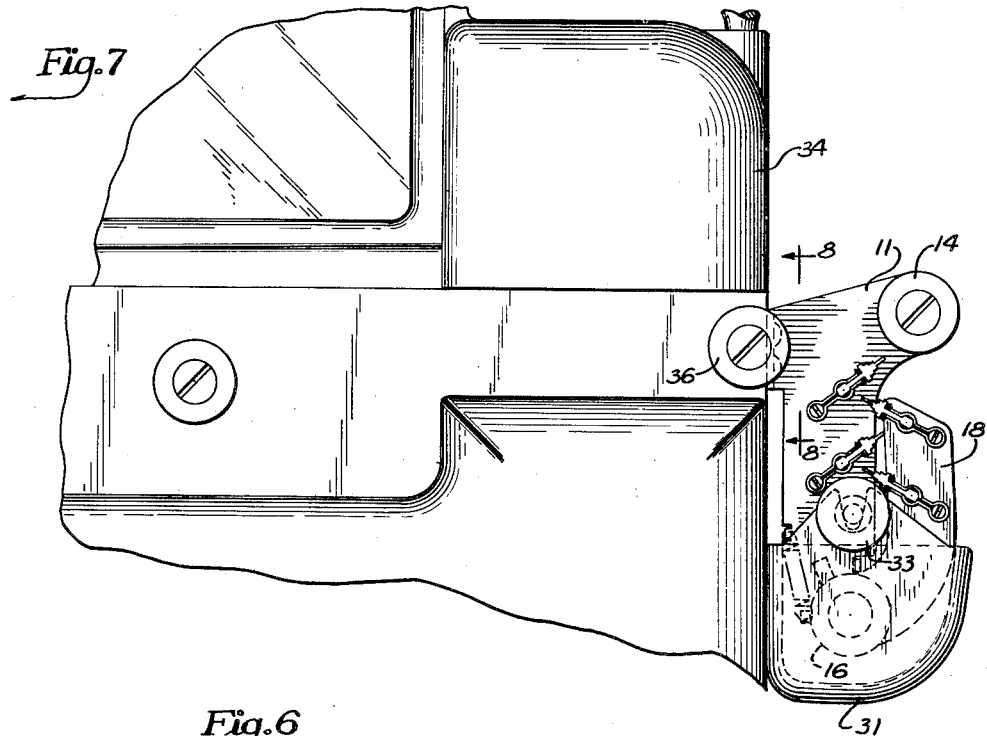
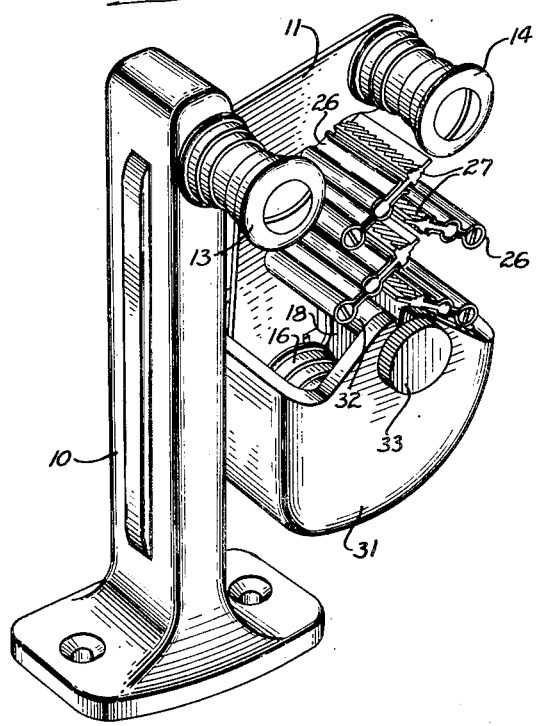
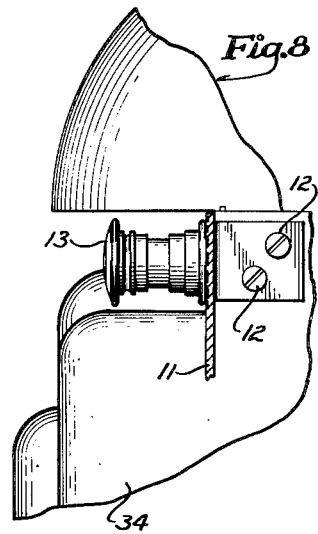

Patented Dec. 30, 1952

2,623,225

UNITED STATES PATENT OFFICE 2,623,225

FILM CLEANING DEVICE

Leo Frankel, Chicago, Ill., assignor, by mesne assignments, to City National Bank and Trust Company of Chicago, as trustee Application November 1, 1947, Serial No. 783,490

6 Claims. (Cl. 15—100)

My invention relates to a device for cleaning motion picture films.

Motion picture film used by the amateur is frequently deleteriously affected by dust and dirt which becomes lodged on the film in the course of time. So far as I know, no acceptable means for cleaning film has been offered to the amateur. It has been proposed that the film be wiped with a soft cloth moistened with a cleaning solution and a cleaning kit comprising solution and a supply of soft cloth squares may be purchased in photographic supply houses. The indicated method of cleaning films is unsatisfactory because regardless of how soft the cloth may be a certain amount of relatively hard particles will accumulate on the cloth and cause a scratching action on the film. The suggested technique is further unsatisfactory because it is impossible to obtain uniform results because of differences in pressure and amount of fluid which are bound to occur because of the impossibility of judging these factors accurately.

The principal object of my invention is the provision of a device for uniformly and expeditiously cleaning motion picture film.

Another object is the provision of such a device so constructed that it may be associated with devices for performing other operations on film and with the result that incidental cleaning may be accomplished.

A further object is the provision of a simple, inexpensive device for cleaning film which may be maintained in condition for uniform and expeditious operation.

Other objects and additional features of the invention will be apparent from a consideration of the following detailed description taken with the accompanying drawing wherein—

Fig. 1 is an elevational view partly in section;

Fig. 2 is a front elevation of the device partly in section;

Fig. 3 is an elevational view looking at the opposite side of Fig. 1 but with the cleaning fluid reservoir removed;

Fig. 4 is a sectional view taken on the line 4—4 of Fig. 3 looking in the direction of the arrows and showing one of the film wipers in elevation;

Fig. 5 is a slightly enlarged sectional view taken on the line 5—5 of Fig. 1;

Fig. 6 is a perspective view showing the form of the device shown in Figs. 1-5, inclusive, including a stand for attachment to a suitable support;

Fig. 7 is a fragmentary elevational view showing the device associated with other apparatus, in this case, a viewer; and Fig. 8 is a fragmentary sectional view taken on the line 8—8 of Fig. 7, looking in the direction of the arrows.

In the form of invention shown in Figs. 1-6, inclusive, I provide a stand 10 to which a flat frame member 11 is secured by means of screws 12. The stand 10 carries a rotatably mounted roller 13 and similar rotatably mounted rollers 14 and 16 are carried by the frame 11. These rollers are suitably mounted to rotate without binding.

The roller 16 is rotatably mounted on a specially shaped stud 17 which projects through an opening in the frame 11 and through a larger opening in an arm 18. A washer 19 is disposed around the narrowed end of the stud 17 and provides a mechanism whereby a nut 21 may be drawn up tightly while still leaving the arm 18 free to swing smoothly about the stud 17 as a pivot. Thus the same stud which rotatably mounts the roller 16 also acts as a pivot point for the arm 18.

The arm is normally held in a lower position pivoted away from the frame 11 because of the influence of gravity and also because of the influence of a spring 22 which is tensioned between a pair of ears carried on the frame and arm, respectively. A projection 23 on the arm engages a lug 24 on the frame to limit the movement of the arm as shown in Fig. 3.

The frame 11 and arm 18 carry a plurality of squeegee wipers 26, the operation of which will be explained hereinafter. The wipers are identical and in each instance comprise a rubber tip 27, clamped between a formed sheet metal retainer, the latter shaped to engage over a split post 28 which thereby holds the squeegee frictionally against removal from the split post. Each of the formed sheet metal retainers has an integral projection 29 (see Fig. 4) which engages in an associated slot on the frame or arm, as the case may be, to thereby hold the squeegee against rotational movement around the post 28. Because of this construction, the squeegees are maintained at the angle shown in Fig. 1, except for such deformation of the rubber squeegee tip 27 as may occur, during a film cleaning operation.

A cleaning fluid reservoir 31 is adapted to extend around the lower portion of the frame 11 and arm 18 so that the roller 16 may project into fluid contents of the reservoir when in position. The reservoir has a vertically slotted extension, a stud or post 32 which is internally threaded to receive a screw 33 being adapted to extend into said vertical slot. The reservoir is thus secured in position by tightening the screw 33.

In the form of invention shown in Figs. 7 and 8, the cleaning device is attached to a viewer 34 or other suitable device which may have a roller 36 in such position that it may replace the roller 13 attached to the standard 10. The viewer 34 may, for example, be a device such as shown in my copending application, Serial No. 14,405, filed March 12, 1948, now Patent No. 2,576,586, issued November 27, 1951, but may be any device through which a film is adapted to pass and to which the film cleaning device may be attached. When making the attachment, the same screws 12, positioned as in the previously described embodiment, may be utilized by merely providing suitable tapped holes in the apparatus. The actual cleaning devices comprising the frame 11 and arm 18 are the same in Figs. 7 and 8 as in the previous embodiment.

Those skilled in the art will understand that the invention may have various forms but that the embodiment shown represents a preferred form of the invention which is found to be advantageous in actual operations. In using the device, the film is threaded on the rollers while the arm 18 is in the position shown in Fig. 3. The film, in other words, will be threaded over the top of roller 13, under roller 16, between the sequeegees and over the top of roller 14. While the parts are in this position, the film is readily brought up between the two sets of squeegees in a generally vertical path. The reservoir 31 is then filled with suitable cleaning liquid, preferably one having carbon tetrachloride as a base, although any acceptable cleaning fluid may be used, and the reservoir is then placed in position on the stud 32 and the nut 33 tightened. It will be seen, particularly from Fig. 1, that when the reservoir is placed in position on the stud 32, the arm 18 is engaged by the reservoir whereby to move or rotate said arm counterclockwise, as viewed in Fig. 1, against the action of the spring 22, the counterclockwise movement of said arm 18 serving to move the wipers 26 together against the film. The film is then cleaned merely by drawing it through the reservoir, the effect being to thoroughly and uniformly wet the film with the cleaning fluid and continuously wipe it by means of the squeegees. While the film itself tends to limit the movement of the arm 18 in a counterclockwise direction (looking at Fig. 1), it will be noted that the arm 18 is offset so that its major portion is in the same plane as the frame 11 and the arm cannot move substantially further than shown in Fig. 1.

While the squeegees have an adequately long useful life, their make-up is such that it may be desirable to replace them from time to time. This may be done by simply pulling them off the split pin and replacing them with a new squeegee. If it is desired to clean them, they may be removed and replaced in the same manner.

What I claim as new and desire to protect by Letters Patent of the United States is:

1. A film cleaner of the character described, comprising a frame, a standard supporting said frame, an arm pivoted at a lower portion of the frame and projecting upwardly therefrom, a plurality of split posts carried by the arm and frame, wiper members each having a metal clamp shaped to fit around a split post, each of said metal clamps having a projection thereon, the projections on those of the metal clamps fitting around the split posts carried by the pivoted arm extending into cooperating recesses in said pivoted arm near said last-mentioned split posts, and the projections on those of the metal clamps fitting around the split posts carried by the frame extending into cooperating recesses in said frame near said last-mentioned split posts, each such metal clamp carrying a rubber wiper in the nature of a squeegee, the wipers projecting at an angle upwardly to engage opposite sides of a film, a post projecting from the frame, a reservoir extending over the lower part of the frame and arm and secured to said post, three rollers carried by the frame to direct the film downwardly into the reservoir, and upwardly between the wipers, one of said rollers being mounted below the wipers and another of said rollers being mounted above the wipers, and a spring between the frame and arm normally swinging the arm in a direction to separate the wipers, the arm and reservoir being so constructed and arranged that assembly of the reservoir to the frame causes such engagement of the arm by the reservoir as to rotate the arm and move the wipers together against the film.

2. A film cleaner of the character described, comprising a frame, an arm pivoted at a lower portion of the frame and projecting upwardly therefrom, a plurality of split posts carried by the arm and frame, wiper members each having a metal clamp shaped to fit around a split post, each of said metal clamps having a projection thereon, the projections on those of the metal clamps fitting around the split posts carried by the pivoted arm extending into cooperating recesses in said pivoted arm near said last-mentioned split posts, and the projections on those of the metal clamps fitting around the split posts carried by the frame extending into cooperating recesses in said frame near said last-mentioned split posts, each such metal clamp carrying a rubber wiper in the nature of a squeegee, the wipers projecting at an angle upwardly to engage opposite sides of a film, a post projecting from the frame, a reservoir extending over the lower part of the frame and arm and secured to said post, means carried by the frame to direct the film downwardly into the reservoir, and upwardly between the wipers, and means normally swinging the arm in a direction to separate the wipers, the arm and reservoir being so constructed and arranged that assembly of the reservoir to the frame causes such engagement of the arm by the reservoir as to rotate the arm and move the wipers together against the film.

3. A film cleaner of the character described, comprising a frame, an arm pivoted at a lower portion of the frame and projecting upwardly therefrom, a plurality of split posts carried by the arm and frame, wiper members each having a metal clamp shaped to fit around a split post, each of said metal clamps having a projection thereon, the projections on those of the metal clamps fitting around the split posts carried by the pivoted arm extending into cooperating recesses in said pivoted arm near said last-mentioned split posts, and the projections on those of the metal clamps fitting around the split posts carried by the frame extending into cooperating recesses in said frame near said last-mentioned split posts, each such metal clamp carrying a rubber wiper in the nature of a squeegee, the wipers projecting at an angle upwardly to engage opposite sides of a film, a reservoir secured to the lower part of the frame, and means to direct the film downwardly into the reservoir, and upwardly between the wipers.

4. A film cleaner of the character described, comprising a frame, an arm pivoted at a lower portion of the frame and projecting upwardly therefrom, a plurality of split posts carried by the arm and frame, wiper members each having a metal clamp shaped to fit around a split post, each of said metal clamps having a projection thereon, the projections on those of the metal clamps fitting around the split posts carried by the pivoted arm extending into cooperating recesses in said pivoted arm near said last-mentioned split posts, and the projections on those of the metal clamps fitting around the split posts carried by the frame extending into cooperating recesses in said frame near said last-mentioned split posts, each such metal clamp carrying a rubber wiper in the nature of a squeegee, the wipers projecting at an angle upwardly to engage opposite sides of a film, a post projecting from the frame, a reservoir extending over the lower part of the frame and arm and secured to said post, and three rollers carried by the frame to direct the film downwardly into the reservoir, and upwardly between the wipers, one of said rollers being mounted below the wipers and another of said rollers being mounted above the wipers, the arm being biased to move in a direction to separate the wipers, the arm and reservoir being so constructed and arranged that assembly of the reservoir to the frame causes such engagement of the arm by the reservoir as to rotate the arm and move the wipers together against the film.

5. A film cleaner of the character described, comprising a frame, an arm pivoted at a lower portion of the frame and projecting upwardly therefrom, a plurality of split posts carried by the arm and frame, wiper members each having a metal clamp shaped to fit around a split post, each of said metal clamps having a projection thereon, the projections on those of the metal clamps fitting around the split posts carried by the pivoted arm extending into cooperating recesses in said pivoted arm near said last-mentioned split posts, and the projections on those of the metal clamps fitting around the split posts carried by the frame extending into cooperating recesses in said frame near said last-mentioned split posts, each such metal clamp carrying a rubber wiper in the nature of a squeegee, the wipers projecting at an angle upwardly to engage opposite sides of a film, a post projecting from the frame, a reservoir extending over the lower part of the frame and arm and secured to said post, three rollers carried by the frame to direct the film downwardly into the reservoir, and upwardly between the wipers, one of said rollers being mounted below the wipers and another of said rollers being mounted above the wipers, and a spring between the frame and arm normally swinging the arm in a direction to separate the wipers, the arm and reservoir being so constructed and arranged that assembly of the reservoir to the frame causes such engagement of the arm by the reservoir as to rotate the arm and move the wipers together against the film.

6. A film cleaner comprising a frame member adapted to be supported in an upright position, an arm pivoted to a lower portion of the frame member, said arm projecting upwardly and lying generally to the side of the frame member, a spring between the arm and frame member biasing the former in a direction away from the latter, a reservoir, means for securing the reservoir to the frame member, said reservoir when so secured engaging said arm and holding it against the bias of the spring at a position near the frame member, squeegee wiper members carried by the arm and frame member at positions to engage opposite sides of a film when the reservoir is in position but to be separated from the film when the reservoir is removed, and guide rollers on the frame to direct the film downwardly into the reservoir and upwardly between the wipers.

LEO FRANKEL.

REFERENCES CITED

The following references are of record in the file of this patent:

UNITED STATES PATENTS

| Number | Name | Date |
|---|---|---|
| 1,716,878 | Dworsky | June 11, 1929 |
| 1,914,890 | Mackler | June 20, 1933 |
| 1,933,084 | Allisson | Oct. 31, 1933 |